United States Patent
Harvey

(10) Patent No.: US 10,858,236 B2
(45) Date of Patent: Dec. 8, 2020

(54) ONBOARD DELIVERY SYSTEM FOR FUEL ADDITIVES

(71) Applicant: R H Fleet Services Ltd., Surrey (CA)

(72) Inventor: Robert A. Harvey, Surrey (CA)

(73) Assignee: RH FLEET SERVICES LTD

( * ) Notice: Subject to any disclaimer, the term of this patent is extended or adjusted under 35 U.S.C. 154(b) by 34 days.

(21) Appl. No.: 16/294,709

(22) Filed: Mar. 6, 2019

(65) Prior Publication Data
US 2019/0276303 A1    Sep. 12, 2019

(30) Foreign Application Priority Data
Mar. 8, 2018 (CA) ...................... 2997835

(51) Int. Cl.

| | |
|---|---|
| B67D 7/14 | (2010.01) |
| B60K 15/03 | (2006.01) |
| B67D 7/36 | (2010.01) |
| B67D 7/62 | (2010.01) |
| B60K 15/00 | (2006.01) |
| G05D 9/12 | (2006.01) |

(52) U.S. Cl.
CPC ............. *B67D 7/145* (2013.01); *B60K 15/00* (2013.01); *B60K 15/03* (2013.01); *B67D 7/36* (2013.01); *B67D 7/62* (2013.01); *G05D 9/12* (2013.01); *B60K 2015/03118* (2013.01); *B60K 2015/03144* (2013.01); *B60K 2015/03348* (2013.01)

(58) Field of Classification Search
CPC . B67D 7/145; B67D 7/36; B67D 7/62; B60K 15/00; B60K 15/03; B60K 2015/03118; B60K 2015/03144; B60K 2015/03348; G05D 9/12
See application file for complete search history.

(56) References Cited

U.S. PATENT DOCUMENTS

| | | |
|---|---|---|
| 3,148,670 A | 9/1964 | Fiedler |
| 4,161,160 A | 7/1979 | Hicks |
| 4,253,436 A | 3/1981 | Dudrey |
| 4,346,689 A | 8/1982 | Neely |
| 4,557,221 A * | 12/1985 | Kamel ................... F02B 51/00 123/1 A |
| 4,568,248 A | 2/1986 | Harders |

(Continued)

*Primary Examiner* — Nicolas A Arnett
(74) *Attorney, Agent, or Firm* — Baumgartner Patent Law; Marc Baumgartner

(57) ABSTRACT

A system, for use with a reservoir, for delivering an additive to a fuel tank is provided. The system comprises: a controller, the controller including a processor, a memory, the memory having housed therein instructions for controlling the processor, a display and a keypad; a temperature sensor, the temperature sensor in electronic communication with the controller; and a fluid delivery system, the fluid delivery system comprising: a pump, the pump for fluid communication with the reservoir and in electronic communication with the controller; a flow sensor, the flow sensor in fluid communication with the pump and in electronic communication with the controller; at least one valve, the valve in electronic communication with the controller and in fluid communication with the flow sensor; and at least one outlet, the outlet in fluid communication with the valve. A method of remotely adding an additive to a fuel tank is also provided.

13 Claims, 3 Drawing Sheets

(56) References Cited

U.S. PATENT DOCUMENTS

| | | | | |
|---|---|---|---|---|
| 5,331,994 A * | 7/1994 | Bryan, III | ............... | F02B 47/00 |
| | | | | 123/1 A |
| 6,068,672 A | 5/2000 | Watson | | |
| 6,478,189 B1 * | 11/2002 | Mooney | ................ | B01F 5/0498 |
| | | | | 222/1 |
| 7,270,088 B2 * | 9/2007 | Whitehall | .............. | F02M 25/00 |
| | | | | 123/1 A |
| 8,061,383 B2 * | 11/2011 | Gouzou | ................. | F02D 19/12 |
| | | | | 123/1 A |
| 8,074,444 B2 * | 12/2011 | Kawakita | .............. | F01N 3/2066 |
| | | | | 60/286 |
| 8,251,022 B2 * | 8/2012 | Yaccarino | ................ | B60K 6/24 |
| | | | | 123/1 A |
| 2002/0060226 A1 | 5/2002 | Kameyama | | |
| 2003/0028285 A1 * | 2/2003 | Zura | ...................... | G06Q 10/08 |
| | | | | 700/241 |
| 2003/0136355 A1 * | 7/2003 | Gouzou | ................. | F02M 25/00 |
| | | | | 123/1 A |
| 2003/0145580 A1 * | 8/2003 | Ripper | ................. | F01N 3/2066 |
| | | | | 60/286 |
| 2007/0101969 A1 * | 5/2007 | Lay | .................... | F02M 37/0047 |
| | | | | 123/304 |
| 2007/0209607 A1 | 9/2007 | Williams | | |
| 2007/0240649 A1 * | 10/2007 | Freeman | ................ | F02D 19/12 |
| | | | | 123/1 A |
| 2008/0092527 A1 * | 4/2008 | Ripper | .................... | F01N 3/303 |
| | | | | 60/286 |
| 2008/0173358 A1 * | 7/2008 | Guldi | ................... | G05D 11/133 |
| | | | | 137/351 |
| 2008/0302986 A1 | 12/2008 | Leahy | | |
| 2013/0193160 A1 | 8/2013 | Hammonds | | |
| 2017/0293310 A1 | 10/2017 | Fogarty | | |

\* cited by examiner

ONBOARD DELIVERY SYSTEM FOR FUEL ADDITIVES

CROSS REFERENCE TO RELATED APPLICATIONS

This application claims benefit of Canadian Patent Application No. 2,997,835, filed Mar. 8, 2018, entitled ONBOARD DELIVERY SYSTEM FOR FUEL ADDITIVE, the contents of which are incorporated herein by reference.

FIELD

The present technology is directed to a delivery system for use on a vehicle. More specifically, it is a delivery system that can be controlled remotely by a driver, and which provides a measured amount of additive to the fuel under control of a processor and memory, the memory having instructions thereon to control the processor.

BACKGROUND

There are numerous additive delivery systems for fluids. For example, United States Patent Application 20130193160 discloses a system for delivering an additive to a flowing fluid wherein the system is in whole or in part powered by the flow of the fluid. The fluid-additive delivery system includes a fluid motor, a speed sensor, an electricity generation and storage system, a clutch, an additive pump, and a flow meter, where the fluid motor and the flow meter are in fluid communication with a piping of the fluid to which the fluid additive is to be added. Preferably, the fluid is a fuel and the fluid additive to be added is a fuel additive. This is designed for delivery of a fluid additive into a fuel that is flowing in a pipe. It would not be suitable for adding a specific and controlled amount of a fuel additive to a fuel tank.

United States Patent Application 20020060226 discloses a flow regulator in a liquid delivery line. The flow regulator includes flow regulation a body having an inflow port through which liquids different from each other in a property such as density, viscosity, etc. flow in the body, and an outflow port through which the liquids flow out from the body. A set of rotators, which are rotated within the body in respective directions opposite to each other is provided to move the liquid by given volumes along the internal wall of the body. And a drive unit for driving the set of rotators is also provided. This construction provides an apparatus which can be used for delivering a liquid, which, in delivering liquids different from each other in viscosity, a given volume of the liquid can be accurately delivered to a liquid delivery line in a continuous manner even though the viscosity of the liquids had varied. This would not be suitable for delivering a fuel additive to a fuel tank of a vehicle. This also would not be suitable for use at low temperatures.

United States Patent Application 20170293310 discloses a method and apparatus for mixing additives into a fluid fuel at a predictable concentration. The method comprises: taking a sample of the fuel; mixing the additive into the sample in metered proportions; testing the sample to determine that the correct amount of additive is present; storing the remaining fuel until it is time for the fuel to be used; and mixing the additive into the remainder of the fuel in the same metered proportions. This would not be suitable for delivering a fuel additive to a fuel tank of a vehicle.

United States Patent Application 20080302986 discloses a method and apparatus for blending several chemicals or fluids together. It also relates in general to a method and apparatus for safely calibrating a flow meter used for addition of liquid chemicals into other liquid chemicals in a closed system to minimize the environmental and occupational risks that may be associated with the added chemicals. In a preferred embodiment, a fluid injection system is provided with an in-line calibration device to permit calibration of the flow meter without introducing the fluid to the environment. In another embodiment, a preferred in-line calibration device is described that can be used to calibrate existing fluid additive injection systems. A method is disclosed for accurately and safely metering in additives to a desired location by employing a closed loop injection/calibration system. This would not be suitable for delivering a fuel additive to a fuel tank of a vehicle as it relies upon a calibration cylinder to calibrate the amount of additive being dispensed, thus, the user would have to leave the cab of the vehicle, read the scale on the piston in the cylinder and make adjustments as needed.

United States Patent Application 20070209607 discloses a fuel additive injection system that includes a fluid additive supply tank, a fluid additive quantity sensor, a flowmeter, remotely controllable valves and a controller including a microcontroller, a visual display and a keypad interface for establishing operation of the system to blend or inject a fuel additive for an internal combustion engine on a vehicle or a stationary apparatus. A quantity of a particular fuel additive to be injected may be selected based on a predetermined amount of fuel added to one or more fuel tanks. The system may keep records of fuel consumption and may utilize pressure air from a source driven by an engine or additive may be injected utilizing a motor driven pump as part of the additive injection system. The system uses pressurized air or power, either of which is available onboard. The additive is stored in an additive storage pressure vessel or a tank in communication with a source of pressurized air. This requires a pressure regulator and an isolation valve. Alternatively the system can include an electric pump.

U.S. Pat. No. 4,568,248 discloses the actual volume of a liquid chemical additive used to treat fuel is measured by an additive flow transducer so that a desired mix ratio can be maintained. In a first preferred embodiment, the amount of additive measured is converted to an equivalent volume treated fuel, and displayed. The user watches the display and stops adding additive when the display indicates that he has already added sufficient additive to treat the actual amount of fuel to be added to the fuel tank. In a second preferred embodiment, the user sets in the desired mix ratio and the volume of fuel that is to be added to the tank, and an electrically driven pump adds additive to the tank until a desired mix ratio obtains. In a third preferred embodiment, both the cumulative fuel flow and cumulative additive flow are sensed and the rate of additive flow is controlled by an automatic control system seeks to maintain a desired mix ratio.

U.S. Pat. No. 4,346,689 discloses an electric pump operated from the dash board of a vehicle, and which pumps additive into the fuel line at a point between the fuel pump and the carburetor.

U.S. Pat. No. 4,161,160 discloses a system for adding additive to the fuel line between the fuel supply and the fuel pump. Because the additive is expensive, a selectively operated valve is provided to limit the flow of additive to the time required for the engine to warm up. A small orifice is installed in the additive supply line to limit the flow of additive into the fuel line.

U.S. Pat. No. 3,148,670 discloses a system in which additive is forced under pressure to flow into the fuel line through a tee.

U.S. Pat. No. 4,253,436 discloses a liquid fuel and additive mixing apparatus that uses a timer calibrated in gallons to operate a constant pressure pump. An orifice limits the flow rate of the additive.

What is needed is a fuel additive delivery system that can be operated from the cab of a vehicle. It would be advantageous if it was micro-processor controlled. It would be more advantageous if the amount of fuel additive to be added could be measured and accurately dispensed based upon the amount of fuel in the tank. It would be more advantageous if the system could adjust for differences in viscosity of the additive in response to temperature to ensure delivery of the correct amount of additive. It would be advantageous if the system could be readily calibrated for additives of different densities or viscosities. It would be most advantageous if the system were operable between about −40° C. and 40° C.

SUMMARY

A fuel additive delivery system is provided that can be operated from the cab of a vehicle. It is micro-processor controlled. The amount of fuel additive to be added can be measured and accurately dispensed based upon the amount of fuel in the tank. The system can adjust for differences in viscosity of the additive in response to temperature to ensure delivery of the correct amount of additive. The system can be calibrated for a wide range of different additives having different densities and/or viscosities. The system is operable between about −40° C. and 40° C.

In one embodiment, a system, for use with a reservoir, for delivering an additive to a fuel tank is provided, the system comprising: a controller, the controller including a processor, a memory, the memory having housed therein instructions for controlling the processor, a display and a keypad; a temperature sensor, the temperature sensor in wireless or electronic communication with the controller; and a fluid delivery system, the fluid delivery system comprising: a pump, the pump for fluid communication with the reservoir and in wireless or electronic communication with the controller; a flow sensor, the flow sensor in fluid communication with the pump and in wireless or electronic communication with the controller; at least one valve, the valve in electronic or wireless communication with the controller and in fluid communication with the flow sensor; and at least one outlet, the outlet in fluid communication with the valve.

In the system, the valve may be a normally closed valve.

In the system, the controller may further include a Secure Digital card.

In the system, the controller may be a mobile device.

In the system, the flow sensor may be a volumetric flow sensor.

The system may further comprise a mobile device in communication with the controller.

In the system, the mobile device and the controller may each include a Bluetooth® transceiver.

In the system, the mobile device may be a cell phone.

The system may further comprise the reservoir.

In the system, the reservoir may include a low fluid indicator.

In another embodiment, a method of remotely adding a fuel additive to at least one fuel tank of a vehicle is provided the method comprising:

a user selecting a system, the system comprising: a controller, the controller including a processor, a memory, the memory having housed therein instructions for controlling the processor, a display and a keypad; a temperature sensor, the temperature sensor in wireless or electronic communication with the controller; and a fluid delivery system, the fluid delivery system comprising: a reservoir, a pump, the pump in fluid communication with the reservoir and in wireless or electronic communication with the controller; a flow sensor, the flow sensor in fluid communication with the pump and in wireless or electronic communication with the controller; at least one valve, the valve in electronic or wireless communication with the controller and in fluid communication with the flow sensor; and at least one outlet, the outlet in fluid communication with the valve;

the user recording, in the controller, the volume of fuel added to the fuel tank;

the controller calculating the volume of additive to be added;

the controller instructing the pump to pump and the valve to open to deliver the additive to the fuel tank; and the controller instructing the pump to stop pumping and the valve to close in response to a signal from the flow sensor that the correct volume of additive has passed through the flow sensor.

The method may further comprise the temperature sensor sending a temperature measurement to the controller, and the controller calculating a flow volume for the temperature measurement before the controller instructs the pump to pump and the valve to open.

The method may further comprise the user selecting a tank to which the additive is to be added.

In yet another embodiment, a method of remotely adding a fuel additive to at least one fuel tank of a vehicle is provided, the method comprising:

a user selecting a mobile device and a system comprising a controller, a temperature sensor, a pump, at least one valve in fluid communication with the pump, and at least one flow sensor in fluid communication with the valve, all in communication with the controller;

the controller receiving temperature data from the temperature sensor;

the user inputting volume of fuel added into the mobile device;

the mobile device communication the volume to the controller;

the controller calculating a volume of additive to add based on the temperature data and the volume of fuel added; and the controller signaling the pump, the valve and the flow sensor to deliver the volume of additive.

In the method the communication between the controller and the mobile device may be by Bluetooth®.

The method may further comprise the controller recording the volume of additive added.

FIGURES

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
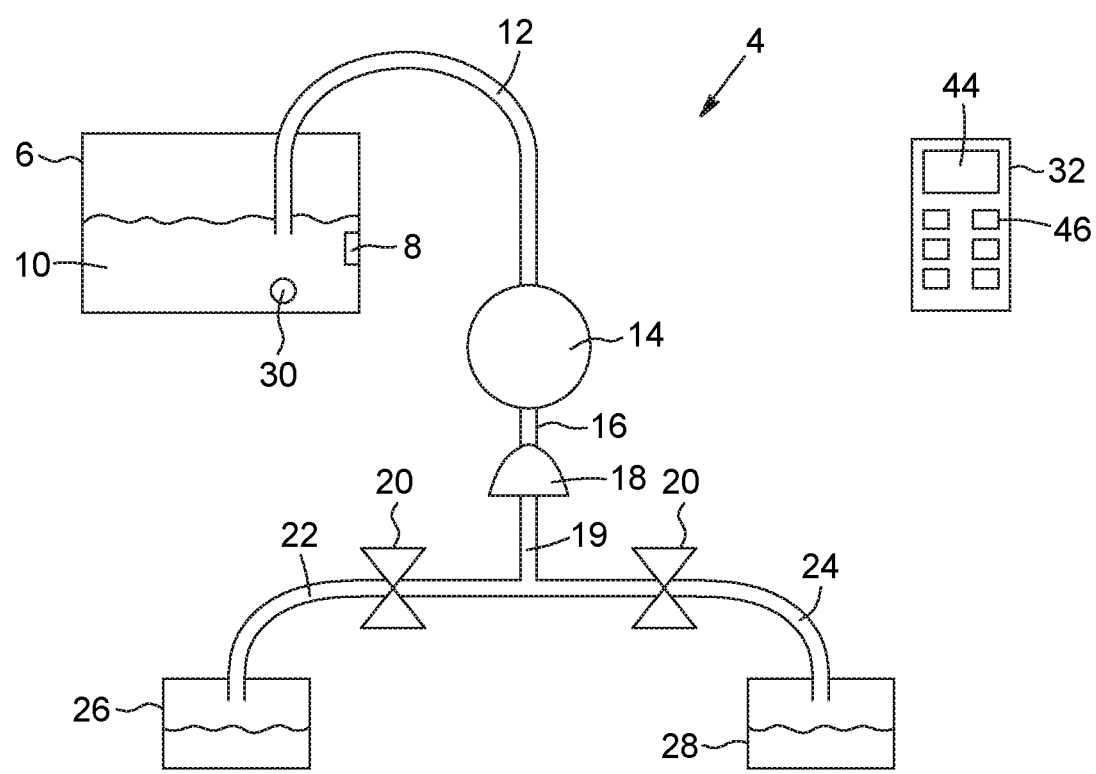
FIG. 1 is a schematic of the fluid delivery system.

A fuel additive delivery system, generally referred to 4 as is shown in FIG. 1. It is a robust system that is operable between about −40° C. and 40° C. A user is able to add a suitable amount of additive from the fuel additive delivery system to the fuel tank of a vehicle remotely, for example, from the cab of a truck. The user need not leave the vehicle.

As shown in FIG. 1, a reservoir 6 retains the fluid 10, and may hold about 10 to about 25 liters, preferably 15 liters of additive. The reservoir 6 is sized to allow a vehicle to operate a complete service cycle with no need to top up the additive. The reservoir 6 includes a low fluid sensor 8. A first fluid line 12 is in fluid communication with the reservoir 6 and a pump 14. Downstream from the pump 14 a second fluid line 16 is in fluid communication with a flow sensor 18 and at least one solenoid valve 20. If there are two solenoid valves 20, a T-line 19 is in fluid communication with the flow sensor 18 and the valves 20. It is a normally closed valve and prevents draining/syphoning of additive reservoir 6. The valves 20 can switch the flow between different outlet lines 22, 24, which in FIG. 1 is shown a first outlet line 22 and a second outlet line 24. The outlet lines 22, 24 are in fluid communication with a first fuel tank 26 and a second fuel tank 28.

Figure 2:
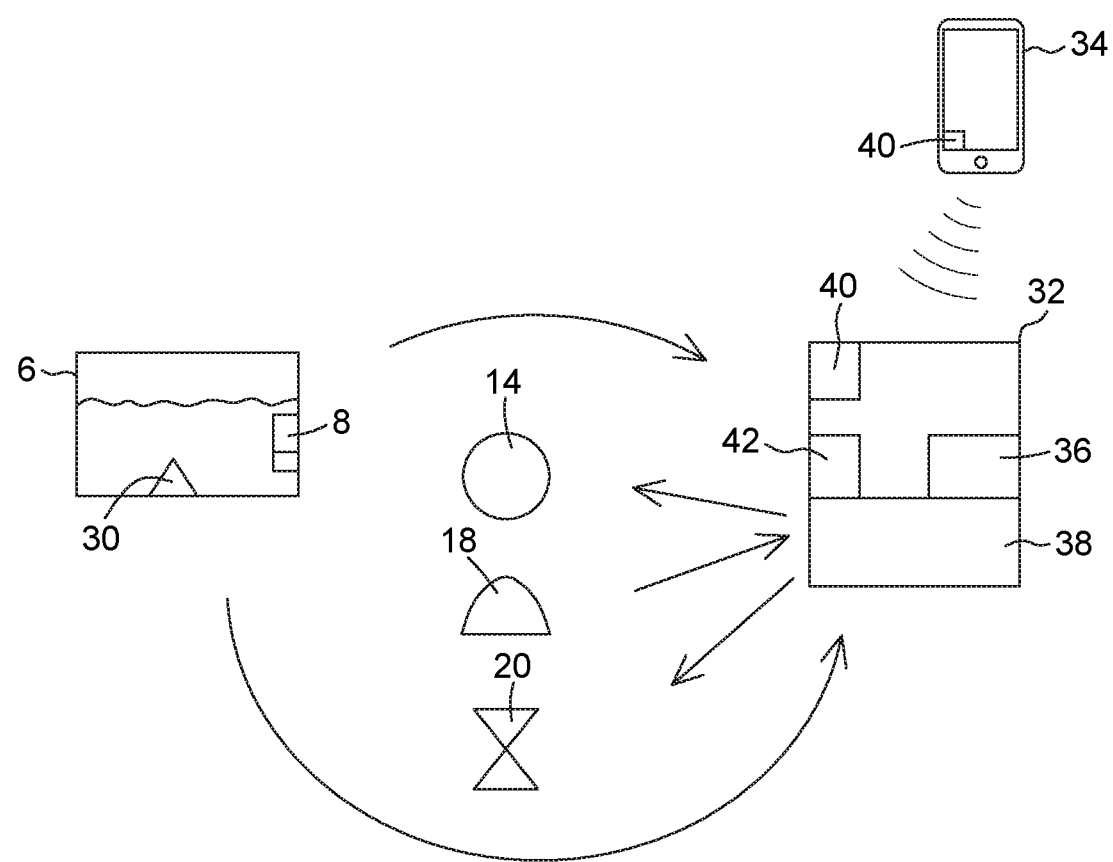
FIG. 2 is a schematic of the electronic communication aspect of the fluid delivery system of FIG. 1.

As shown in FIGS. 1 and 2, the additive temperature is monitored by a temperature sensor 30, which is in electrical communication with a controller 32. The temperature sensor 30 is located in the reservoir 6 and is in contact with the additive.

As shown in FIG. 2, in the preferred embodiment, the controller 32 communicates with a mobile device 34, for example, but not limited to a cellular phone or a tablet, which may be in the cab of the truck. The controller 32 includes a microprocessor 36 and a memory 38, the memory having instructions thereon for controlling the microprocessor 36. A Bluetooth® transceiver 40 in the mobile device 34 sends instructions to a Bluetooth transceiver (or receiver) 40 in the controller 32. The controller 32 is in electronic communication with the solenoid valves 20, the pump 14, the low fluid indicator 8, the flow sensor 18 and temperature sensor 30. The received data is stored in a data logger 42, which in the preferred embodiment is a Secure Digital (SD) card. The SD card also holds a record of the user, by driver number, the amount of additive added and the date and time it was added. As shown in FIG. 1, data are displayed in a readout 44. A keypad 46 on the controller 32 allows for the user to enter inputs. Alternatively, the user may choose to enter inputs on the mobile device 34 and to use the readout 44 on the mobile device 34.

Figure 3:
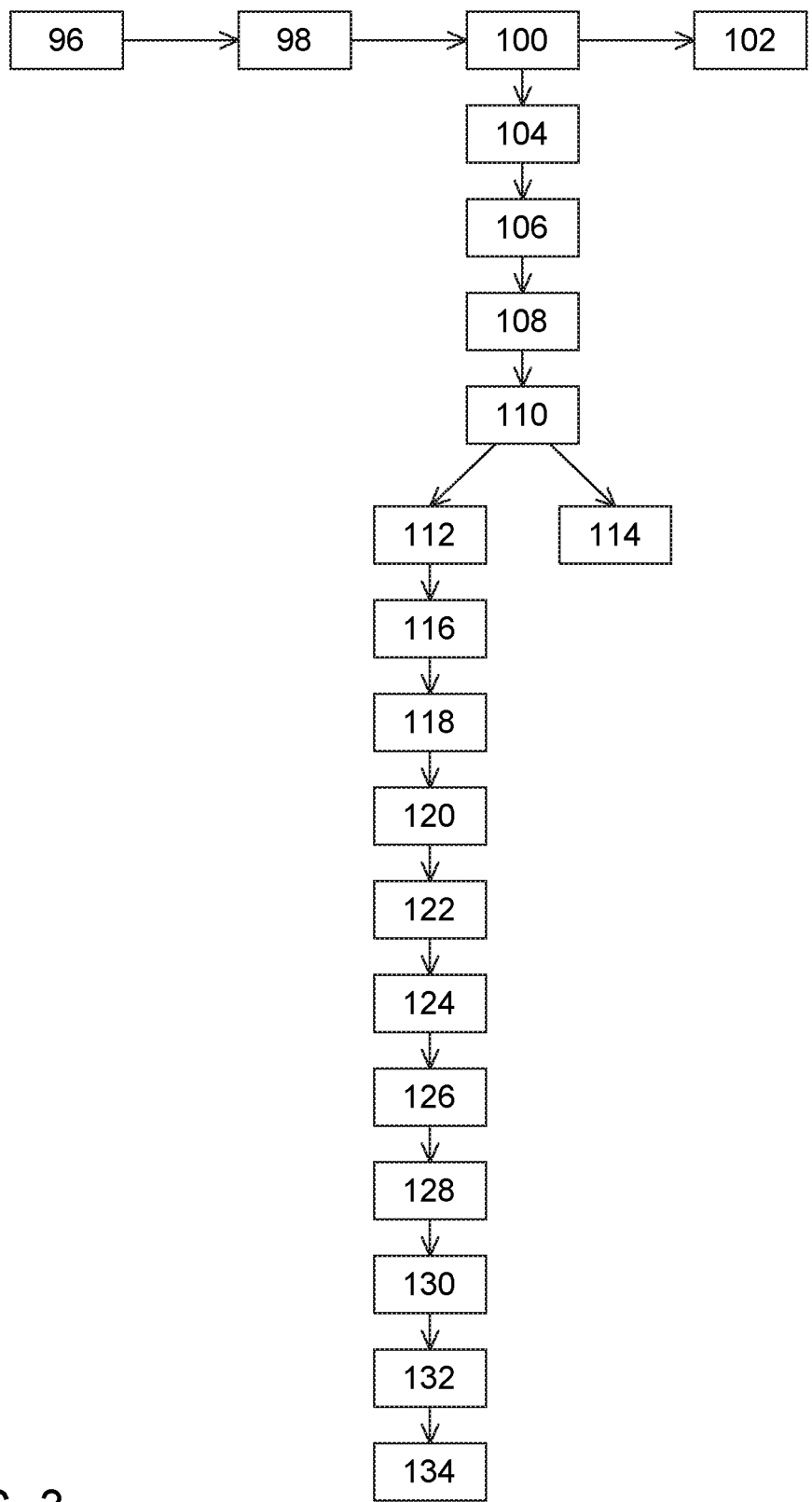
FIG. 3 is a schematic of the logic of the fluid delivery system of FIG. 1.

A flow chart is shown in FIG. 3, demonstrating the logic of the system. The system will not function without the SD card in place, so the user must ensure 96 that the card is in place. The user presses Enter 98 to start the process. They then enter 100 their operator number. If the low fluid indicator 8 is activated, the controller 10 will display "low fluid" and will not operate 102. The user then selects 104 the tank to which the additive is to be added, keys in 106 the number of litres of fuel just added to that tank and the software calculates 108 the amount of additive to be added. The mix ratio is programmable. In one example, the desired ratio of additive to fuel is 1:1000 v/v.

The amount of additive to be added is displayed 110 on the readout and the user either accepts 112 or rejects 114 that amount. Before the additive begins to flow, the additive temperature is measured 116 and sent 118 to the software where an adjustment of flow time is calculated 120 based on a calculation of viscosity for that temperature. The adjusted time is displayed 122 to the user. The user then selects 124 Start and the appropriate solenoid valve opens 126 and the pump begins to pump 128. The flow sensor 18 reports 130 that the fluid is flowing and is flowing to the selected tank. The readout displays 132 the amount of additive that has flowed in millilitres. The data are recorded 134 on the SD card. By tracking the data from a specific user, an owner can review and ensure that the user is being honest, hence it adds a level of accountability.

The flow meter is not a mass flow meter and therefore changes in viscosity will affect the accuracy of the readout (viscosity of the exemplary additive ranges from about 2.4 $mm^2/s$ at 40° C. to about 48 $mm^2/s$ at −20° C.). A mass flow meter was found to be unsuitable for the application. The preferred flow meter is an oval gear micro flow meter, as it is able to withstand the colder temperatures. By using a combination of a temperature sensor and a flow sensor, accuracy is improved to at most about ±5%, preferably to at most about ±2%, as compared to at least ±10% without the combination. Further, the system can be readily adjusted for use with additives that have different densities and/or viscosities to one another.

In an alternative embodiment, the pump is housed in the reservoir. In yet another embodiment, there are flow meters downstream from the valves. In another embodiment, the controller is hard wired rather than communicating by Bluetooth®. In yet another embodiment, all communication is wireless and may be through Bluetooth®, using, for example, Arduino. In this embodiment, the controller may be the mobile device, which would include an application for controlling the system, including determining flow times, and logging the data.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. An onboard system for delivering an additive to a fuel tank, the system comprising: a controller, the controller including a processor, a memory, the memory having housed therein instructions for controlling the processor, and configured to calculate an additive flow time based on one or more of an operating temperature or a viscosity, a display and a keypad; an additive delivery system in electronic communication or wireless communication with the controller, the additive delivery system comprising: a reservoir; a pump, the pump in fluid communication with the reservoir and in electrical communication with the controller; a volumetric flow meter downstream from the pump, the volumetric flow meter in fluid communication with the pump and in wireless or electronic communication with the controller; at least one valve downstream from the volumetric flow meter, the valve in wireless or electronic communication with the controller and under control of the controller; at least one outlet downstream from the valve, the outlet in fluid communication with the valve; and a temperature sensor, the temperature sensor housed in the reservoir and in contact with the additive, the temperature sensor in wireless or electronic communication with the controller, to provide the operating temperature to the controller.

2. The system of claim 1, wherein the valve is a normally closed valve.

3. The system of claim 2, further comprising a mobile device in communication with the controller.

4. The system of claim 3, wherein the volumetric flow meter is an oval gear micro flow meter.

5. The system of claim 4, wherein the mobile device and the controller each include a wireless transceiver.

6. The system of claim 3, wherein the mobile device is a cell phone.

7. The system of claim 6, wherein the reservoir includes a low fluid indicator in electrical communication with the controller.

8. The system of claim 1, wherein the controller is a mobile device and communication between the mobile device and each of the temperature sensor, the pump, at least one valve and at least one flow sensor is wireless.

9. A method of adding a fuel additive from a reservoir to at least one fuel tank of a vehicle, the method comprising:
providing an onboard fuel additive delivery system, the system comprising a controller, the controller including a processor, a memory, the memory having housed therein instructions for controlling the processor and configured to calculate an additive flow time based on one or more of an operating temperature or a viscosity, a display and a keypad, a temperature sensor, the temperature sensor housed in the reservoir and in contact with the additive, the temperature sensor in wireless or electronic communication with the controller, to provide the operating temperature to the controller, and an additive delivery system, the additive delivery system comprising: the reservoir, a pump, the pump in fluid communication with the reservoir and in wireless or electronic communication with the controller; a flow meter, the flow meter downstream from the pump and in fluid communication with the pump and in wireless or electronic communication with the controller; at least one valve, the valve downstream from the flow meter, in wireless or electronic communication with the controller, under control of the controller and in fluid communication with the flow meter; and at least one outlet, the outlet in fluid communication with the valve;
a user selecting the system;
the user recording, in the controller, the volume of fuel added to the fuel tank;
the controller calculating the volume of additive to be added based on the volume of fuel added to the fuel tank or to be added to the fuel tank;
the controller calculating the flow time based on one or more of the operating temperature and viscosity;
the controller instructing the pump to pump and the valve to open to deliver the additive to the fuel tank; and
the controller instructing the pump to stop pumping and the valve to close in response to a signal from the flow meter that the correct volume of additive has passed through the flow meter.

10. The method of claim 9, further comprising the temperature sensor sending a temperature measurement to the controller, and the controller calculating a flow volume for the temperature measurement before the controller instructs the pump to pump and the valve to open.

11. The method of claim 10, further comprising the user selecting a tank to which the additive is to be added.

12. A method of directly adding a fuel additive to at least one fuel tank of a vehicle after refueling, the method comprising:
providing an onboard delivery system for a fuel additive comprising a controller, and in series, a temperature sensor, a pump, at least one valve in fluid communication with the pump, and at least one flow meter in fluid communication with the valve, all in communication with the controller;
a user selecting a mobile device in wireless or electronic communication with the system;
the controller receiving temperature data from the temperature sensor;
the user inputting a volume of fuel to be added to the fuel tank or added to the fuel tank into the mobile device;
the mobile device communicating the volume to the controller;
the controller calculating an additive flow time based on the additive temperature data and the volume of fuel added; and the controller signaling the pump, the valve and the flow meter to deliver the volume of additive.

13. The method of claim 12, further comprising programming a mix ratio.

* * * * *